United States Patent
Donaldson

(10) Patent No.: US 11,122,005 B2
(45) Date of Patent: *Sep. 14, 2021

(54) SECURE DYNAMIC ADDRESS RESOLUTION AND COMMUNICATION SYSTEM, METHOD, AND DEVICE

(71) Applicant: Willie L. Donaldson, Alexandria, VA (US)

(72) Inventor: Willie L. Donaldson, Alexandria, VA (US)

(73) Assignee: Secommix, LLC., Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,183

(22) Filed: Apr. 7, 2020

(65) Prior Publication Data

US 2020/0344198 A1    Oct. 29, 2020

Related U.S. Application Data

(63) Continuation of application No. 16/166,866, filed on Oct. 22, 2018, now Pat. No. 10,616,177, which is a
(Continued)

(51) Int. Cl.
*H04L 29/12* (2006.01)
*H04L 29/06* (2006.01)

(52) U.S. Cl.
CPC .......... *H04L 61/1511* (2013.01); *H04L 61/10* (2013.01); *H04L 61/2076* (2013.01);
(Continued)

(58) Field of Classification Search
CPC ...... H04L 67/306; H04L 67/10; H04L 65/605
See application file for complete search history.

(56) References Cited

U.S. PATENT DOCUMENTS

| 6,058,168 | A | 5/2000 | Braband |
| 6,282,183 | B1 | 8/2001 | Harris et al. |

(Continued)

FOREIGN PATENT DOCUMENTS

| WO | WO2016160977 | 6/2016 |
| WO | WO2016160957 | 10/2016 |

OTHER PUBLICATIONS

Anonymous, Editing the/etc/inet/hostsFile(System Administration Guide, vol. 3),pp. 1-2,XP055452727, Retrievedfromtheinternet: URL: https:/docs.oracle.com/cd/E19455-01/806-0916/6ja8539dh/index. html [retrieved on Feb. 21, 2018], Jan. 1, 2010.
(Continued)

*Primary Examiner* — El Hadji M Sall
(74) *Attorney, Agent, or Firm* — Malloy & Malloy, P.L.

(57) ABSTRACT

The present invention is directed to systems and methods for providing secure dynamic address resolution and communication. Accordingly, a node may include processor and memory having instructions thereon, that when executed, cause the node to pair with another node. The pairing may include creating a DNS record on the node including a current address associated with the second node, this current address may be dynamically updated. The instructions may further allow the node to transmit a message to the second node, based on a resolved address from the DNS record on the first node. Authentication, dynamic message encryption and the provision of a DNS cache may further be implemented on the node.

20 Claims, 11 Drawing Sheets

Related U.S. Application Data continuation-in-part of application No. 15/085,205, filed on Mar. 30, 2016, now Pat. No. 10,110,552, and a continuation-in-part of application No. 15/085,237, filed on Mar. 30, 2016, now Pat. No. 10,110,580.

(60) Provisional application No. 62/140,889, filed on Mar. 31, 2015.

(52) U.S. Cl.
CPC .......... *H04L 63/0428* (2013.01); *H04L 63/08* (2013.01); *H04L 61/2007* (2013.01); *H04L 61/6009* (2013.01)

(56) References Cited

U.S. PATENT DOCUMENTS

| | | | |
|---|---|---|---|
| 7,543,067 | B2 | 6/2009 | Matsubayashi et al. |
| 7,721,093 | B2 | 5/2010 | Sundararajan |
| 8,032,165 | B2 | 10/2011 | Dudziak et al. |
| 8,189,768 | B2 | 5/2012 | Raniere |
| 8,474,053 | B2 | 6/2013 | Branson et al. |
| 8,578,166 | B2 | 11/2013 | De Monseignat et al. |
| 8,594,331 | B2 | 11/2013 | Jordan et al. |
| 8,687,804 | B2 | 4/2014 | Dillaway |
| 9,740,781 | B2 | 8/2017 | Statia et al. |
| 9,813,337 | B2 | 11/2017 | Trace et al. |
| 10,110,552 | B2 | 10/2018 | Donaldson |
| 10,110,580 | B2 | 10/2018 | Donaldson |
| 10,616,177 | B2 | 4/2020 | Donaldson |
| 2007/0183457 | A1 | 8/2007 | Leitch |
| 2007/0277030 | A1 | 11/2007 | Jobbagy et al. |
| 2009/0055917 | A1 | 2/2009 | Miyazawa |
| 2009/0147699 | A1 | 6/2009 | Ruy et al. |
| 2010/0250777 | A1* | 9/2010 | Morris ................. H04L 61/609 709/245 |
| 2011/0153630 | A1 | 6/2011 | Vernon et al. |
| 2011/0238801 | A1 | 9/2011 | Bahl |
| 2014/0254595 | A1* | 9/2014 | Luo ....................... H04L 67/104 370/392 |
| 2014/0258707 | A1 | 9/2014 | Denny |
| 2015/0222667 | A1 | 8/2015 | Nayshtut et al. |
| 2015/0350044 | A1 | 12/2015 | Thomassian et al. |
| 2015/0381820 | A1 | 12/2015 | Ting et al. |
| 2016/0094557 | A1 | 3/2016 | Kadur et al. |
| 2016/0164875 | A1 | 6/2016 | Zhang et al. |
| 2016/0294767 | A1 | 10/2016 | Donaldson |
| 2017/0085549 | A1 | 3/2017 | Donaldson |

OTHER PUBLICATIONS

Christoph Haas, Christoph Haas: Re : [Openvpn-users]/ etc/hosts and /etc/ resolv.conf precedence?,, Apr. 13, 2007, pp. 1-2, XP055452896, Retrieved from the Internet: URL: https://openvpn.net/archive/openvpn-users/2007-04/msg00109.html [retrieved on Feb. 21, 2018], Apr. 13, 2007.

Hoffman, hoffmaninternetmailconsortiump:smtpserviceextensionforsecuresmtpovertransportlayersecurity;rfc3207.txt,smtpserviceextensionforsecuresmtpovertransportlayersecurity;rfc3207.txt,interneten gineeringtaskforce,ietf:standard,internetsociety(isoc)4ruedesfalaises, Feb. 1, 2002.

Kalafut, Kalafut A et al: Pollution Resilience for DNS Resolvers, Communications, 2009, ICC '09 IEEE International Conference on, IEEE, Piscataway, NJ, USA, Jun. 14, 2009 (Jun. 14, 2009), pp. 1-5, XP031506316, ISBN: 978-1-4244-34-35-0, Jun. 14, 2009.

Nomx, nomx videos: nomx how it works, youtube, Mar. 23, 2016 (Mar. 23, 2016), p. 1 pp., XP054978131, Retrieved from the Internet: URL: https://www.youtube.com/watch?v=VtQkkMs6ay8 [Retrieved on Feb. 21, 2017], Mar. 23, 2016.

\* cited by examiner

SECURE DYNAMIC ADDRESS RESOLUTION AND COMMUNICATION SYSTEM, METHOD, AND DEVICE

CLAIM OF PRIORITY

The present application is a continuation of a previously filed, application having Ser. No. 16/166,866, filed on Oct. 22, 2018, which matured into U.S. Pat. No. 10,616,177 on Apr. 7, 2020, which itself was a continuation-in-part of a previously filed application having Ser. No. 15/085,205, filed on Mar. 30, 2016, which matured into U.S. Pat. No. 10,110,552 on Oct. 23, 2018, which claiming priority under 35 U.S.C. Section 119(e), to a provisional patent application having Ser. No. 62/140,889 and having a filing date of Mar. 31, 2015, as well as a continuation-in-part of a previously filed application having Ser. No. 15/085,237 filed on Mar. 30, 2016, which matured into U.S. Pat. No. 10,110,580 on Oct. 23, 2018 and claiming priority under 35 U.S.C. Section 119(e), to a provisional patent application having Ser. No. 62/140,889 and having a filing date of Mar. 31, 2015, all of which are explicitly incorporated herein by reference, in their entireties.

BACKGROUND OF THE INVENTION

Field of the Invention

The present invention generally relates to a secure dynamic address resolution and communication protocol, and related systems, methods, and devices for mitigating network vulnerabilities. Specifically, the present invention provides for the secure and local name resolution and communication between devices connected to one another over any available network using a proprietary communications protocol, wherein the devices can resolve each other's addresses directly without the use of a third party domain name system and/or mail exchange system, even upon network or device(s) changes.

Description of the Related Art

The Domain Name System (DNS) is a hierarchical distributed naming system for computers, services, and various devices and resources connected to a network such as the Internet or other network. Most prominently, a DNS translates domain names to numerical IP addresses so devices can communicate with each other via their domain names, which are more easily memorized by humans as compared to a series of numeric numbers. In other words, DNS functions as the Internet's primary directory service, much like a telephone book, for associating a name (e.g., domain.com) to a numeric Internet Protocol (IP) address (e.g., 1.23.45.678).

DNS is used in various application layer communications such as in web communication or email communication. In web communication, such as via the Hypertext Transfer Protocol (HTTP) protocol, a web URL such as http://www.domain.xyz can therefore be resolved to a numeric IP address 1.23.45.678, such that a user may access a remote web server and website via a standard web browser. In email communication, such as those carried by the Simple Mail Transfer Protocol (SMTP), the "domain.xyz" portion of a "user@domain.xyz" email address is resolved via a DNS in order to retrieve a mail exchanger (MX) record of the host, so that a message can properly reach its intended destination.

Unlike a telephone book directory, a central DNS directory can be updated quickly in the event of server changes or hardware changes, without affecting end users. That is, an important function of DNS today is its central role in distributed Internet services such as in cloud services or in content delivery networks. The key advantage is that unlike a phone book, different users can simultaneously resolve different translations of the same domain name, to different a proximal servers that provide faster response times to the end users.

However, major fallbacks of the DNS system are primarily related to security concerns. For example, one susceptibility of a third party or public DNS system is the subversion of a resolution query, in that a DNS may be hijacked or redirected to an unintended host. In web communication, an unaware user may be redirected to a malicious website mirroring a real website, which may then "phish" or misappropriate that user's information such as login credentials and other user information. In email communication, a transmitted message may be redirected to a dummy host in order to intercept that message. Such DNS hijacking may be performed when a computer's TCP/IP configurations are overwritten to point to a rogue DNS server under the control of an attacker, or through modifying behaviors of a trusted DNS server to create such a noncompliant resolution or redirect.

Accordingly, there is a need in the industry for a secure dynamic address resolution and communication protocol, which provides additional security in address resolution, while remaining backwards compatible with modern communication protocols, in one embodiment.

SUMMARY OF THE INVENTION

The present invention is generally directed to a secure dynamic address resolution and communication protocol, including accompanying systems, methods, and devices thereof. Primarily, the present invention, including accompanying devices, systems, and methods, are intended to mitigate various vulnerabilities in transmission, routing, acceptance, communication, and storage of data between two or more nodes or devices.

Accordingly, a method of the present invention may include first pairing a plurality of nodes, including a first node and second node, also known as a "handshake". The initial pairing may require initial entry of an identifier or code generated on each of the two devices or nodes, of the other device to be paired. An authentication scheme is identified between each set of paired nodes, such as the first and second node pair. The authentication may comprise unique keys, passcodes, certificates, or other known methods of authentication of the two nodes or devices. A DNS record may be created on the first node having a current address of the second node, and on the second node having a current address of the first node. These DNS records may be updated dynamically. That is, a new address associated with the second node may be received at the first node, when the address on the second node changes. This new address may then be stored as the current address associated with the second node on the first node. The previous address of the second node may be stored within a DNS cache on the first node.

A message may be transmitted from the first node to the second node, in which the current address associated with the second node is resolved at the first node, based on the first node's DNS record. The current address associated with the second node is then authenticated, to ensure the identity of the second node (and also the first node, from the second node's perspective). If the authentication fails or if the second node is not reachable, a previous address within the DNS cache may be utilized in another attempt, until the cache is exhausted. The advantage of this step is to ensure that the message is transmitted to the proper addressee, and from the addressee's standpoint, to prevent any unauthorized or spam messages. Only upon successful authentication, is the message transmitted from the first node to the second node. The first node may receive messages from the second node in a similar fashion. In one embodiment, the message may be encrypted for transmission, down to the character level. The encryption may be dynamic, such as to change after each message, or at other predetermined intervals or conditions, such as upon an address change associated with a node. The encryption may occur at the beginning, end, or as an aggregate encryption map that is submitted or negotiated separately from each packet so that the header details may not be submitted within the same transmission.

In one embodiment, a "kill-switch" may be implemented in the event of a termination condition, such as to disengage the second node from at least the first node. A kill-switch may be transmitted via a message or email to a node to be terminated, and/or through a packet injection or P2P TCP dump with unique authentication factors. Upon receiving a termination command, all records at the receiving node may be erased.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As schematically represented in the accompanying drawings, the present invention is generally directed to a secure dynamic address resolution and communication protocol, including accompanying systems, methods, and devices thereof.

A. Overview of Implementation System(s) and Device(s)

Figure 1:
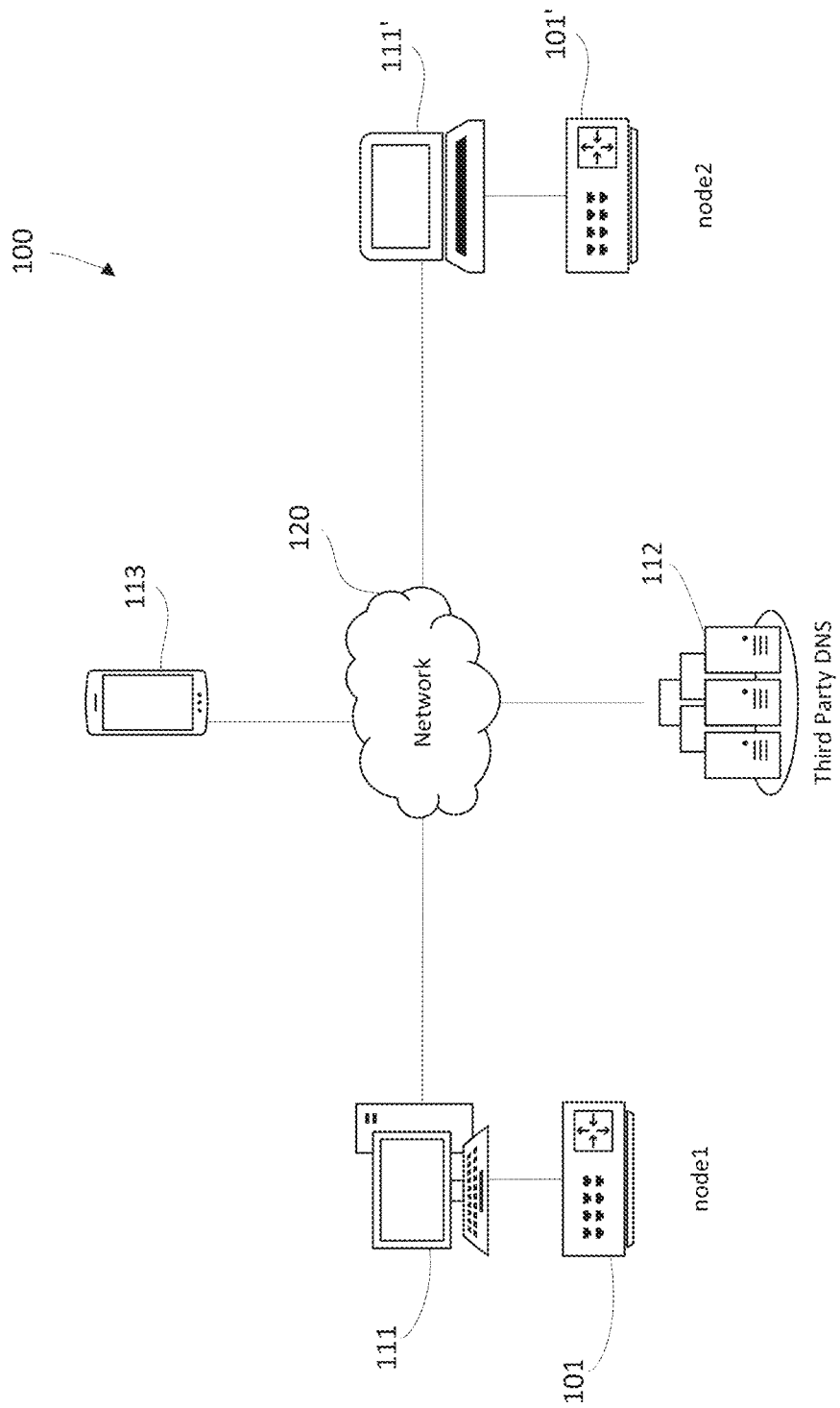
FIG. 1 is a diagrammatic representation of an exemplary system for providing secure dynamic address resolution and communication.

In one embodiment, a system 100 of the present invention for secure dynamic address resolution and communication may be implemented as generally represented in FIG. 1. Accordingly, the system 100 generally comprises a plurality of nodes including a first node 101 and a second node 101', each configured to dynamically route communication to a specified destination node, based at least on locally stored address at the transmitting node. The node(s) 101 and 101' may each be communicably connected to a computer 111 and 111', in order to redirect communication or data from the computers to each other and to other computers and/or nodes over a network 120, over one or more transmission protocol(s).

The nodes 101, 101' or devices may comprise a general purpose computer comprising a central processing unit (CPU) 111, which may be a single core or multi core processor, memory 114 (random-access memory, read-only memory, and/or flash memory) or primary memory for high-speed storage of executing programs, electronic storage unit 115 (e.g., hard disk) or secondary memory for storing data, communications interface 112 (e.g., network adapter) for communicating with other devices or computers over a network, and/or peripheral device(s) 113 in communication with the CPU 111 that enable input/output of the application server 110. The nodes 101, 101' may comprise a thin client or specialized computer for performing the functionality directed to secure dynamic routing and communications described herein, including but not limited to Raspberry Pi, Arduino Uno, BeagleBone Black, Banana Pi, PandaBoard, LinksSrite pcDuino, Intel Galileo, Intel NUC, Odroid-Cl, and other hardware and respective software for supporting the functionality of the present invention as known to those skilled in the art. In one embodiment, a node 101 of the present invention may be implemented on a mobile device under an iOS, Android, or other mobile operating system or platform, as illustrated by node 113 in FIG. 1.

Figure 7:
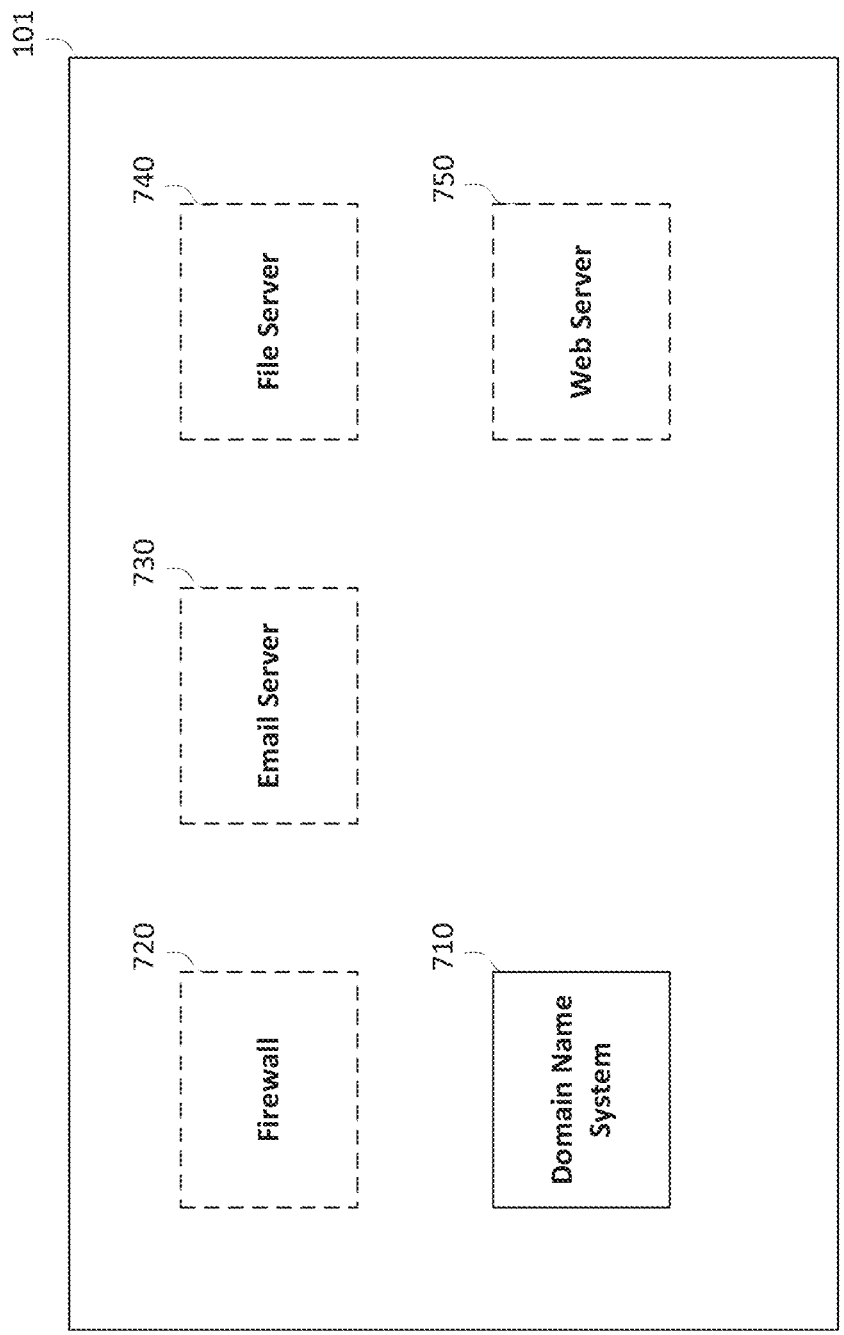
FIG. 7 is a diagrammatic representation of an exemplary node for providing secure dynamic address resolution and communication.

Drawing attention to FIG. 7, a node 101 (or 101') may comprise software or programmable instructions stored there on, including a domain name system server 710, and one or more of a firewall 720, email server 730, file server 740, and web server 750. Different combinations of these components, modules, or software, may be implemented in conjunction with the domain name system that allows for the direct resolution of a current address associated with another device.

The firewall 720 may comprise software that monitors and controls incoming and outgoing network traffic, based on predetermined security rules that might be set by a user. A user may, for example, add a number of trusted addresses and/or protocols that are assumed to be secure, block various addresses and/or protocols, and/or set combinations of rule based allowance or rejection of various traffic.

The domain name system (DNS) server 710 may comprise software for implementing a directory for associating identifiers (such as email addresses, web addresses, ftp addresses) or other identifiers with the current Internet or other network reachable address of another node, for direct communication to the same without having to resolve that address from a third party. The DNS server may comprise an authoritative server or recursive server and may comprise caching functionality, the ability to host and/or resolve wildcard records. The DNS server may comprise, for example and without limitation, BIND, Cisco Network Registrar, DNS Blast, Dnsmasq, djbdns, gdnsd, Knot DNS, MaraDNS, Microsoft DNS, Nominum Authoritative Name Server, Nominum Vantio, NSD, pdnsd, Posadis, PowerDNS, Simple DNS, dnrd, YADIFA, Yaku-NS, combinations or other programmed equivalents thereof.

The email server 730 may comprise mail transfer agents (MTA), mail delivery agents (MDA), and other computer software for providing email or message handling services. The email server may support one or more of POPS, IMAP and/or SMTP protocols. The email server 730 may comprise, for example and without limitation, Atmail, Apache, Axigen, Bongo, Citadel, Exmin, Haraka, hMailServer, Mailtraq, Mailtraq, Microsoft Exchange Server, MDaemon, MeTA1, Postfix, qmail, qpsmtpd, Sendmail, Smail, VPOP3, WinGate, XMail, Zimbra, ZMailer, and other equivalents thereof. In one embodiment, mail filtering programs may additionally be implemented.

The file server 740 may comprise sharing disk access of the node 110 and/or the computer or storage connected to the node 110 or local network thereof. The file server 740 may comprise a file transfer protocol (FTP) server that allows the node to act as a host to another node or device over a TCP-based network, such as the Internet. The file server 740 may comprise security features, and may be secured with SSL/TLS, SSH, or other encrypted and/or secure protocols known to those skilled in the art. In other embodiment, the file server 740 may utilize the server message block (SMB) protocol.

The web server 750 may comprise software or combinations of instructions that when executed, processes requests via the HTTP protocol. A user may access the web server 750 via a web browser as known to those skilled in the art, including but not limited to INTERNET EXPLORER®, GOOGLE CHROME®, MOZILLA FIREFOX®, etc. The web server 750 of the node may be implemented via an Apache server, IIS, nginx, GWS. The web server 750 may be implemented via a combination of one or more of Apache, Cherokee, Lighttpd, Perl, PHP, Python, MariaDB, MySQL, and/or other appropriate software or solution stacks known to those skilled in the art. These solution stacks may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, and other past, present, or future equivalent solution stacks, or combinations thereof, known to those skilled in the art that allows a programmer to develop the methods and computer programs described within this application.

The node 101, 101' may comprise a user interface that allows a user to access and interact with configurations thereof. The user interface may be proprietary and may comprise a custom developed mobile or desktop application(s). Alternatively, or in addition to, the user interface may comprise a web browser, mobile browser, or other application or executable code that allows for communication and visualization of information. The node is further configured with executable or interpretable computer code that allows it to perform the processes described within this application. The user interface may be implemented via a computer program which may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations, and combinations thereof.

Figure 8:
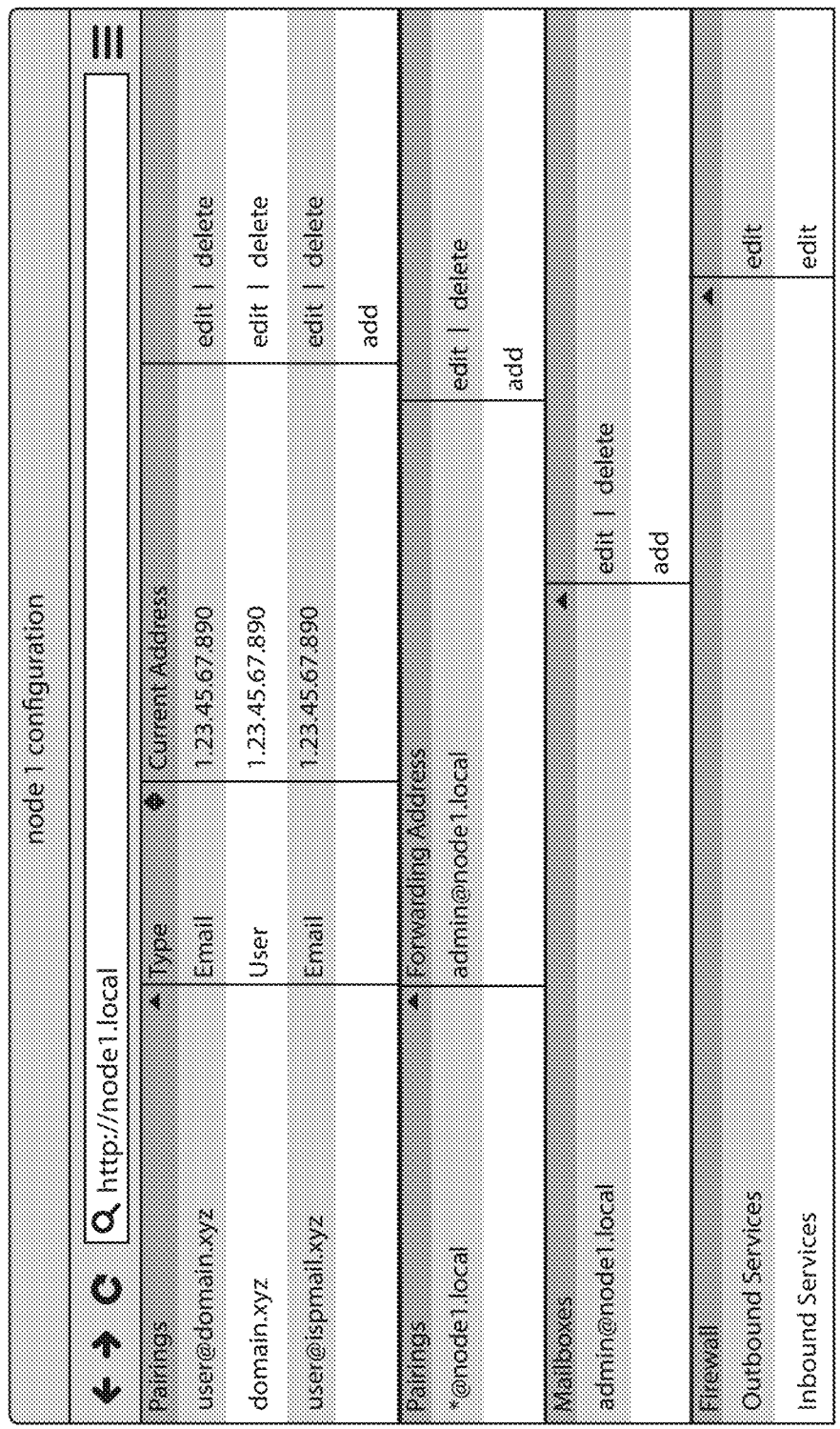
FIG. 8 is an exemplary wireframe illustrating configurations of an exemplary node for providing secure dynamic address resolution and communication.
Figure 9A:
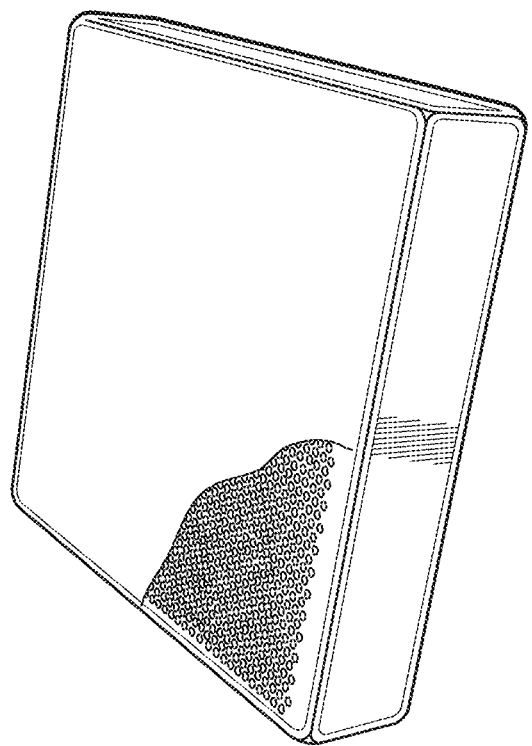
FIG. 9A is an exemplary node for providing secure dynamic address resolution and communication, in accordance with one embodiment of the present invention.
Figure 9B:
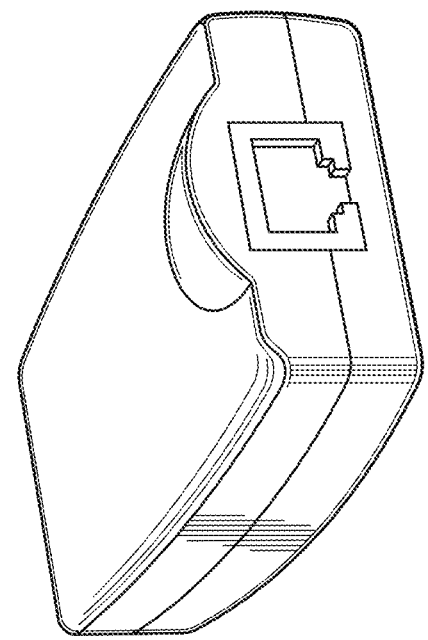
FIG. 9B is an exemplary node for providing secure dynamic address resolution and communication, in accordance with one embodiment of the present invention.

In one embodiment of the present invention and as illustrated at FIG. 8, a user of the present invention may be able to pair a plurality of devices, such as at least a second node with a first node via a graphic user interface. A node may comprise a thin client connected to a router of the user and may be accessible via wired LAN or WiFi connection, in other embodiments, NFC technology may similarly be utilized. The node may comprise a web server having thereon instructions of configuring the functionality of the node via a graphical user interface as illustrated by the wireframe of FIG. 8, via a standard web browser. A user may add, edit, or delete pairings from the first node (node1) to other nodes as shown. For example, an email address user@domain.xyz and a web address of domain.xyz may be associated with a second node having current IP address 1.23.45.67.890, such that any email or web communications may be sent directly to the current address. In one embodiment as explained in detail below, the current address may be updated dynamically via dynamic DNS means, such as receiving new addresses from another paired node, as that paired node detects a network change. The current address may refer to an IPv4, IPv6, MAC address, general host name, a domain name utilizing another DNS service, or any other address or identifier for reaching a paired node for communication. In order to utilize the functionality of the present invention, a user may set the local (LAN) IP address associated with the node within an email client, such that all email traffic, or traffic of a particular type, or all traffic, may be routed through the node for domain name resolution.

As such, in one embodiment, the node of the present invention may further comprise functionality including an email server, wherein a user may add, edit, delete, or otherwise configure email accounts that may be stored in whole or in part on the node itself. Conventional email functions including the ability to set email aliases, forwarding emails, etc., may be implemented. All messages may be stored locally on the node in one embodiment, in order to ensure safety and security of the messages. In one embodiment, firewall services may be implemented on the node.

The computers 111, 111' may refer to any mobile device, tablet, desktop or laptop computer, wearable electronic device, or other device or combination of circuits structured and configured to communicate with another device, computer, or server over the network 120.

In at least one embodiment, a node 101 or 101' described above may be implemented as an integrated device as depicted by node 113. That is, the functionality of the present invention may be implemented as software or as a software on a chip embedded or integrated into an integrated device, such as a mobile device, phone tablet, personal computer, wearable electronic devices, or other combination of circuits structured and configured to perform the functionalities of a node described herein.

The third party DNS 112 may comprise a domain name system (DNS) connected to network 120, and may be utilized as a fallback resolution system for the present invention.

The network 120 may comprise at least two computers in communication with each other, which may form a data network such as via LAN, WAN, Serial, Z-WAVE, ZIGBEE, RS-485, MODBUS, BACNET, the Internet, or combinations thereof. The connections may be facilitated over various wired and/or wireless mediums or any combination thereof including interconnections by routers and/or gateways. Network 130 may comprise additional hardware components and/or devices appropriate for facilitating the transmission and communication between the various systems and devices of the present invention, such as those directed to integrated authentication, quality control or to improve content delivery such as via a content delivery network (CDN).

Various aspects of the present invention may be thought of as "products" or "articles of manufacture" typically in the form of machine (or processor) executable code, interpretable code, and/or associated data that is carried on or embodied in a machine readable medium. Machine-executable code can be stored on an electronic storage unit, such memory (e.g., read-only memory, random-access memory, flash memory) or a hard disk, as described above.

All or portions of the software may at times be communicated through the Internet or other communication networks. Such communications, for example, may enable loading of the software from one computer or processor onto another, for example, from a management server or host computer onto the computer platform of an application server, or from an application server onto a client computer or device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, tangible "storage" media, terms such as computer or machine "readable medium", refer to any medium that participates in providing instructions to a processor for execution. Further, the term "non-transitory" computer readable media includes both volatile and non-volatile media, including RAM. In other words, non-transitory computer media excludes only transitory propagating signals per se, but includes at least register memory, processor cache, RAM, and equivalents thereof.

Therefore, a machine readable medium, such as computer-executable code, may take many forms, including but not limited to, a tangible storage medium, a carrier wave medium or physical transmission medium. Non-volatile storage media include, for example, optical, magnetic, or solid state disks, such as any of the storage devices in any computer(s) or the like, such as may be used to house the databases. Volatile storage media include dynamic memory, such as main memory of such a computer platform. Tangible transmission media may include coaxial cables, copper wire and fiber optics, communication buses. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

B. Overview of the Secure Dynamic Address Resolution Process

1. Dynamic Address Resolution Between Nodes

Figure 3:
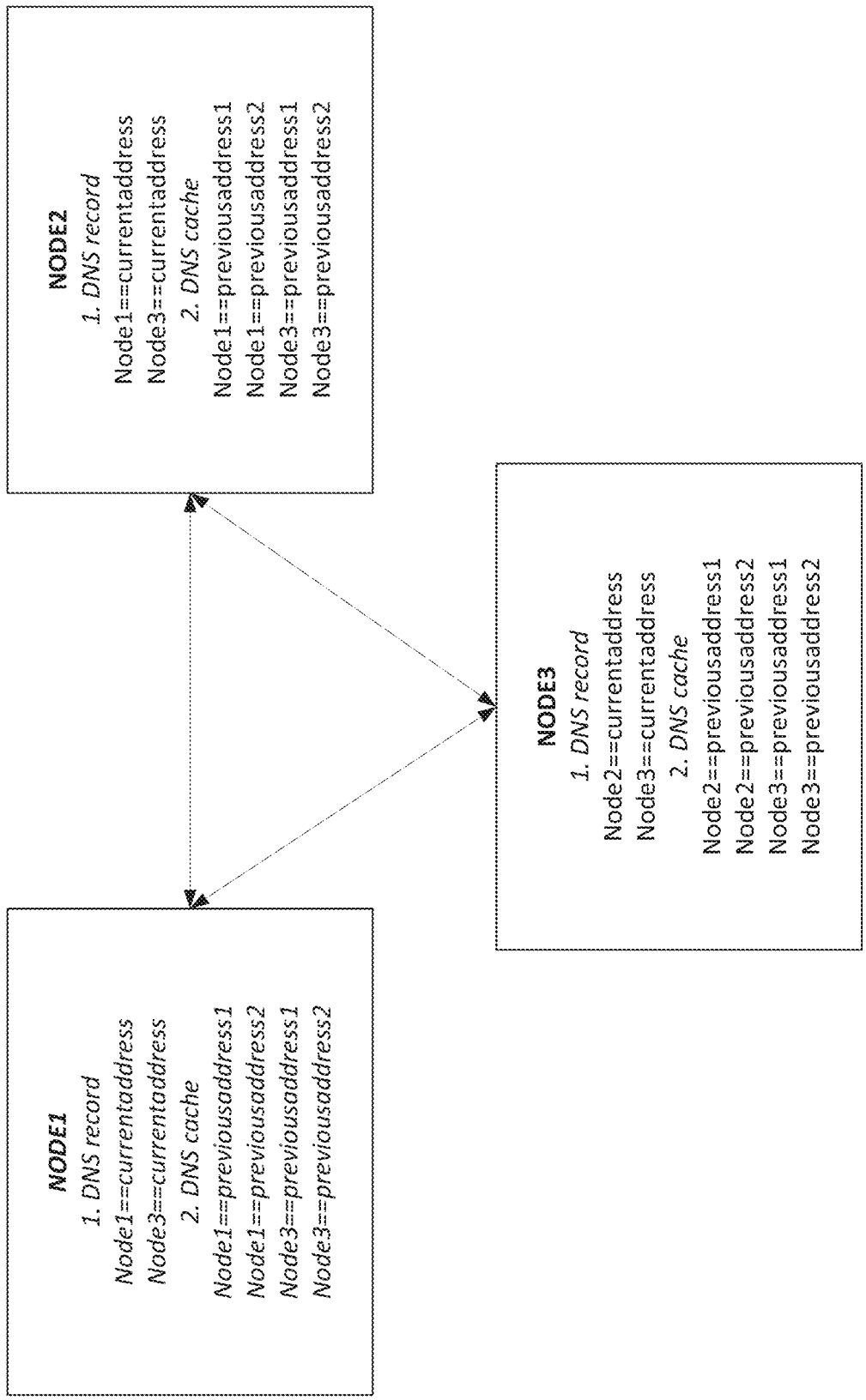
FIG. 3 is a diagrammatic representation illustrating a DNS record and cache of the various secure dynamic address resolution and communication nodes of the present invention.
Figure 4:
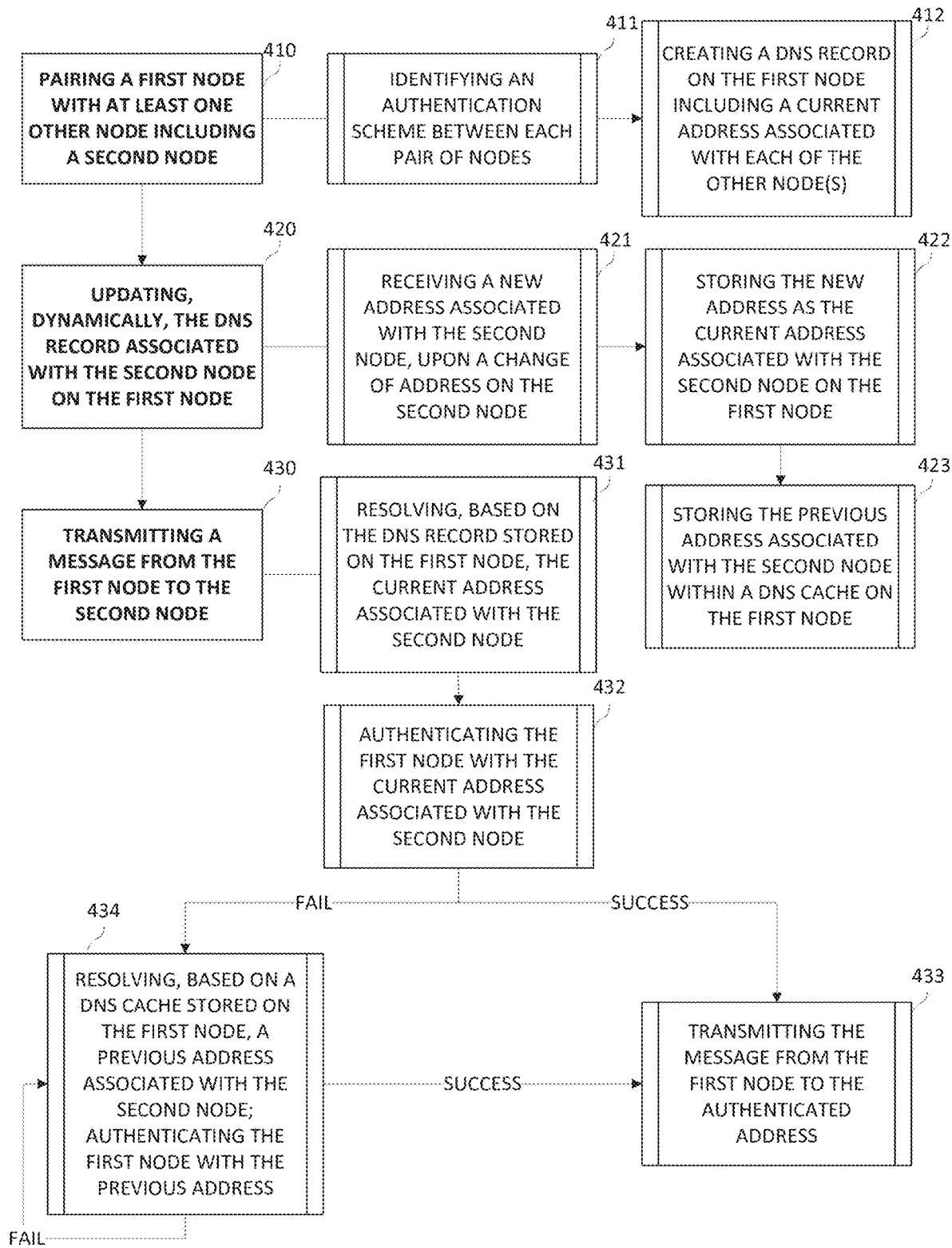
FIG. 4 is a flowchart illustrating a method for providing dynamic address resolution and communication between a plurality of nodes of the present invention.

Drawing attention to FIG. 4, one method for providing secure dynamic address resolution and communication is shown, including the dynamic address resolution process. Accordingly, a plurality of nodes is initially paired, as in 410. During the pairing process, an authentication scheme may be identified between each pair of nodes, as in 411. The authentication may require an initial pairing via a key, such as to generate a unique key, pin, or password on each node, to require entry on the other node, in order to facilitate a successful initial handshake or pairing. The key may in some embodiments comprise a MAC address, IMSEI, or other software or hardware identifier associated with a node. A DNS record may be created, as in 412, on each node, such as the first node, including a current address associated with each of the other node(s). One embodiment of a DNS record is generally illustrated at FIG. 3, in which each paired node comprises a current address of all other paired node(s), as well as a list of previous address(es) associated with the other paired node(s). In order of priority, a current address may first be attempted by a first node in resolving a second node. In the event that the second node is unreachable, a previous address may be utilized as a fallback address. As another example, attention may be drawn to FIG. 8 of the present invention illustrating a GUI of a node as explained above.

For purposes of the DNS record, a "node" may be identified by or associated with one or more of an Internet Protocol (IP) address, a DNS resolution or domain name via domain services, a general host name, MAC address, or other identifier. In one example related to the resolution of a domain name associated with or identifying a node, when a user transmits an email message to a destination address "user@domain.xyz" from a first computer 111, the message is routed through a first node 101 in communication therewith. The DNS record is checked for whether "domain.xyz" or "user@domain.xyz" is associated with a paired node, such as a second node 101'. If the DNS record on the first node 101 reflects that the destination address is associated the second node 101', it is then resolved to the current address associated with the second node 101', as indicated in the first node 101's DNS entry as illustrated in FIG. 3. The message is then transmitted to the current address associated with the second node 101'. If no record exists for the destination address in the first node 101, then it may merely bypass the DNS resolution service of the first node 101, and may be routed by conventional means through a third party DNS 112 or public DNS, and therefore message transmission remains backward compatible with conventional Internet communications, in one embodiment. Accordingly, the DNS record may comprise MX records, A records, CNAME records, TXT records, and other appropriate records known to those skilled in the art for accessing various services of transmitting various data over a network, and may comprise individualized settings, such as TTL for record caching, which may all be custom set by a user via a user interface of a node such as illustrated at FIG. 8.

Figure 2:
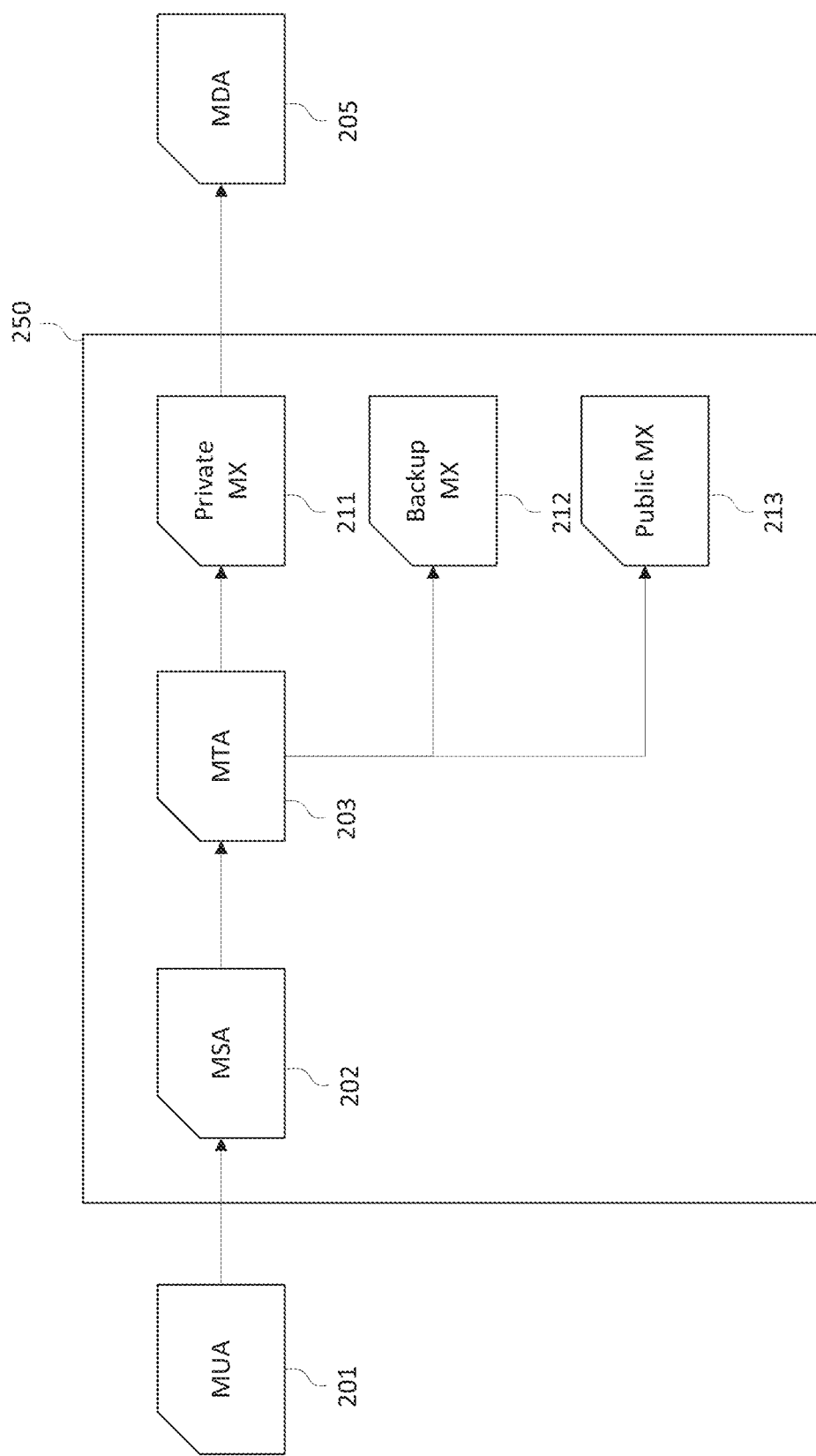
FIG. 2 is a diagrammatic representation illustrating the transmission of an email message in accordance to a secure dynamic address resolution and communication system or method of the present invention.

For further illustrative purposes, FIG. 2 additionally provides a functional example of an email transmission in accordance to a secure dynamic address resolution and communication system or method of the present invention. Accordingly, a mail user agent (MUA) 201 such as an email client software may be configured to allow a user to create and send an email. The email is sent to either a mail submission agent (MSA) 202 and/or a mail transfer agent (MTA) 203, two variations of the SMTP protocol, and is then routed to a destination via a Mail Exchanger (MX). In accordance with the present invention, a private MX 211 may be utilized to resolve a private and direct address (i.e. a "current address" as described above, associated with a destination, such as user@domain.xyz), if the private MX indicates that a record exists for a node associated with the destination, such as the email address user@domain.xyz or domain.xyz. In the event that a record does exist but the resolved address is unreachable, a backup MX 212 record may be utilized, in order to attempt previous addresses associated with the destination. In the event that no record exists, traditional or public MX 213 may be utilized for the destination address, such as the mail service provided by domain.xyz. Upon resolving the address associated with the destination, the email is transferred to the mail delivery agent 205 for delivery to the destination inbox. In at least one embodiment of the present invention, a node 101 or 101' of the present invention may comprise the functionalities of the MSA 202 or MTA 203, and MX 211, 212, 213, as indicated at 250.

Drawing attention back to FIG. 4, the DNS record associated with a first node may be dynamically updated across the paired nodes, as in 420. Accordingly, upon detecting a new address on the second node, the new address may be transmitted to all other paired nodes including the first node. In other words, the new address associated with the second node, upon a change of address on the second node, is received at the first node, as in 421. The new address may then be stored as the current address associated with the second node on the first node, as in 422. The previous address may be stored within a DNS cache associated with the second node on the paired node, as in 423. The DNS record of current addresses and previous addresses associated with paired nodes may be better illustrated at FIG. 3, wherein each node comprises a DNS record with all current addresses associated with other nodes. In one embodiment, new procedures and/or authentication protocols may also be transmitted or negotiated between each pair of nodes, such as to include new key(s), certificate(s), passcode(s), or other authentication or identification mechanisms or identifiers.

The dynamic updating of DNS across the plurality of paired nodes may update in real time, near real time, or at least periodically, in order to provide uninterrupted access to the secure communication and resolution protocol of the present invention. This updating may occur asynchronously, such that each pair of nodes remain in delayed synchrony with one another. That is, the Internet service provider utilized by a second node 101' and attached computer 111 may provide a new IP address upon a connection reset, or a user may physical move the second node 101' to a different location and Internet connection. As such, upon detecting a changed IP, the second node 101' may communicate this to all other paired nodes, including at least the first node 101', to be updated in the first node's DNS record.

A message may be transmitted from a first node to a second node, as in 430, in accordance local DNS resolution on the transmitting node or in this case the first node. The current address associated with the second node in resolved, as in 431, based on the DNS record stored on the first node. The first node is then authenticated with the current address associated with the second node, as in 432. The authentication may comprise authentication or validation by key as described above, during the initial pairing of the two nodes. In other words, the identity of the second node is verified first by the first node, prior to a message is authorized to be transmitted. As such, keys, login credentials such as user password, authorized certificates, or other known methods may be used. In one embodiment, if the authentication fails, such that the second node may not be reachable, a previous address associated with the second node may be resolved at the first node, as in 434, and the authentication step is reinitiated with the previous address. This step 434 may recur until a previous address returns a successful authentication, or until the list of previous addresses is exhausted. Only upon successful authentication, is the message transmitted from the first node to the authenticated address, as in 433. In one embodiment, the second node or receiving node may also request authentication from the first node or transmitting node, and if authentication fails, the second node may additionally and/or separately refuse to accept the message, even if the message is transmitted. This authentication may comprise a key check, a certificate check, or other authentication check(s) or combinations thereof known to those skilled in the art.

2. Secure Communication Between Nodes

Figure 5:
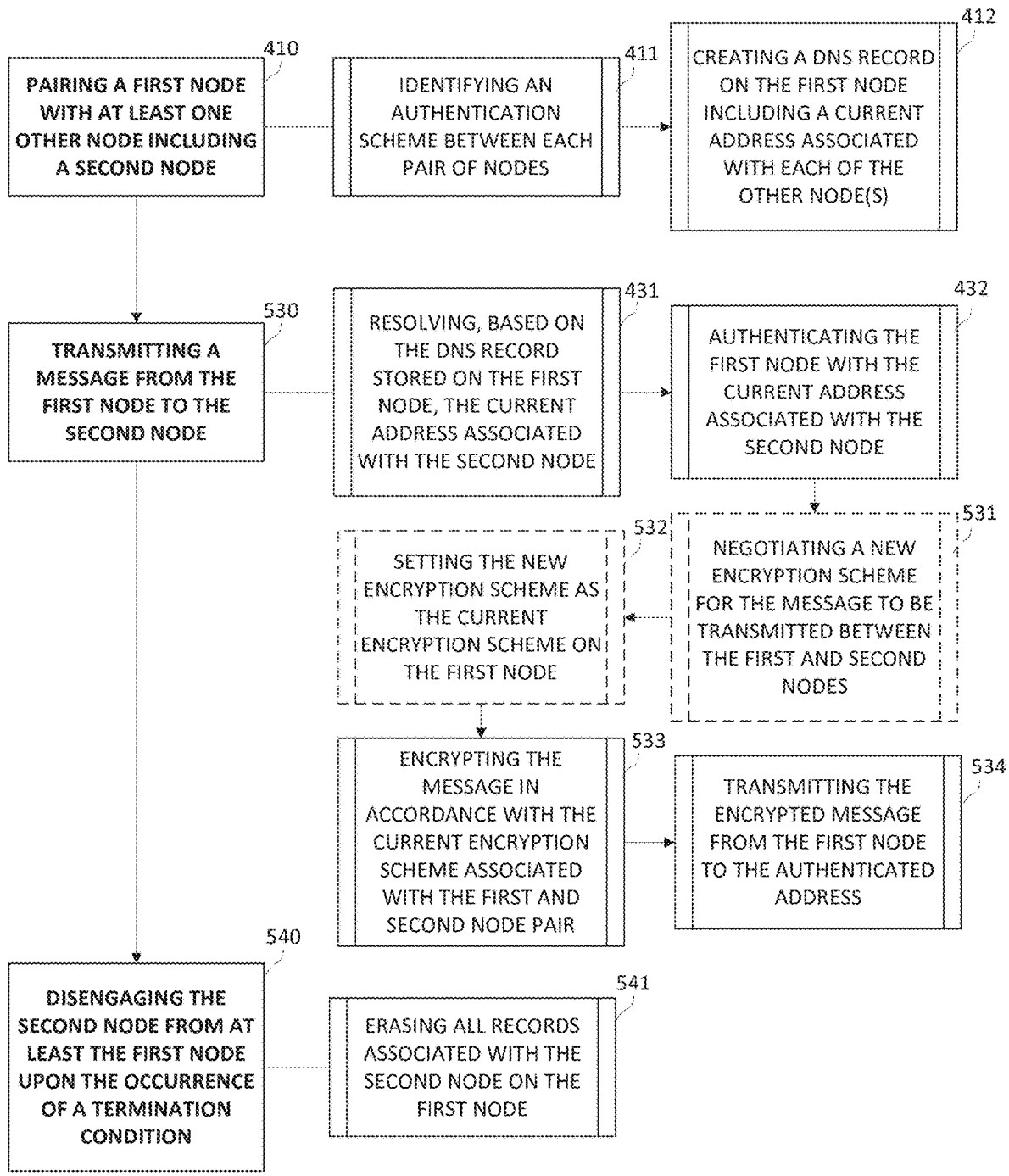
FIG. 5 is a flow chart illustrating a method for providing secure communication between a plurality of nodes of the present invention.

Drawing attention to FIG. 5, another method for providing secure dynamic address resolution and communication is illustrated, including various encryption and message security features. As such, a plurality of nodes is paired, as in 410. An authentication scheme is identified between each pair of nodes, including the first node and second node, as in 411, which may be similar to the embodiment(s) described above. To reiterate, and generally speaking, pairing between two devices allows the devices to communicate directly to each other securely while blocking unrecognized traffic or preventing transmission to an unknown node, that is, without the need for third party DNS lookup, MX relay, SMTP gateway, or remote storage. The pairing may comprise generating a key, certificate, or other authentication mechanism on each of the nodes, and requiring manual entry on the other nodes to be paired, in order to authenticate the initial connection. The pairing may require the users to verify the IMSEI, MAC, IP address, or other identifiers associated with node(s) a user may wish to pair. A DNS record is created on each node including a current address associated with each of the other node(s), as in 412.

A message is transmitted from a first node to a second node, as in 530. The current address associated with the second node, is resolved, based on the DNS record on the first node, as in 431. The first node is authenticated with the current address associated with the second node, as in 432. A new encryption scheme may then be negotiated for the message to be transmitted between the first and second nodes, as in 531. In one embodiment, this step may only follow upon successful authentication between the first and second node pair. In at least one embodiment, the highest level of encryption available between the two nodes may be identified. The identification may comprise a testing process, beginning with a test of security of the highest level, and falling back to lower levels if failure in higher level security results, until there is a successful pairing between two devices. The encryption scheme may comprise symmetric encryption, asymmetric encryption, hashing, or other methods known to those skilled in the art. For example, encryption may comprise AES, DES, Blowfish, Serpent, Twofish, RSA, combinations and alternating combinations thereof. As such, the encryption scheme may be performed at the message or the character level, for any messages or data to be transmitted.

This encryption scheme, after agreement and/or negotiation between the two nodes, may be set as the new encryption scheme to use going forward, and set as the current encryption scheme at least on the first node, as in 532. The negotiation 531 and setting new encryption 532 steps may be performed at predetermined intervals, such as prior to, after the transmission of each message, after a predetermined number of messages, or upon the occurrence of some condition, such as when a current address is dynamically updated at one or more of the paired nodes. It should further be noted that this encryption of the message occurs independently and/or in addition to the initial authentication during pairing and the following authentication prior or at message transmission between the nodes. The data or message interchange following the initial encryption scheme may then be independently encrypted using a new hash at the smallest packet level agreed. This may entail each individual character being encrypted using different encryption schema, and a random-length hash that does not exceed the agreed initial encryption scheme or algorithm. By dynamically modifying the encryption schema and the length of the hash, the parties may communicate with assurance that even if a particular character was intercepted or comprised, the entire message or data would not be.

For example, typical packet encryption sends a block of data and then uses a checksum to verify or validate that the entire block has been transported to and received by the receiver. When the data block is not received in its entirety, the whole data block is resubmitted. This is based on length of agreed buffer sizes between packet routing mechanism at the local, routing, and recipient stages. While this type of encryption is useful for reliability and path redundancy, it contains multiple vulnerabilities that the present invention overcomes by submitting the packet sizes and encryption keys randomly and/or dynamically, without the need for a checksum or a static buffer size. This type of encryption modification ensures that present packet sniffers and router backdoor vulnerabilities, are not effective at comprising data communicated over the system and method of this invention.

This encryption schema is then replicated with the node(s) and negotiated for the next submission of packets with the encryption last agreed to. So at any time if a packet is lost or is submitted without the expected encryption it is denied. By requiring a specifically encrypted data packet the node(s) shall refuse any connections from illegitimate sources. This will therefore remove any spam or unsolicited data via various communication protocols, such as emails, VoIP, or chat. In one embodiment, this dynamic encryption process may be submitted at the beginning, end, or as an aggregate map of individual packets for each message transmitted between the node(s). That is, in an email example, a node of the present invention may comprise logic that prevents the SMTP or MX processor to query or inspect packets, if the packets come from unknown or untrusted sources. This relieves the MTA of any potential security comprise because it will never inspect data that was not trusted to be sent from a paired node.

Drawing back to FIG. 4 and the next step, the message is encrypted in accordance with the current encryption scheme associated with the first and second node pair, as in 533. The encrypted message is then transmitted from the first node to the authenticated address, as in 534.

In at least one embodiment, a second node is disengaged from the plurality of nodes, such as at least the first node, upon the occurrence of a termination condition, as in 540. A termination condition may, for example, comprise a predetermined time period of unreachability of a node, an encryption error or failure to authenticate of a message received from or transmitted to the second node. Upon a termination condition, all records associated with the first node may be erased on all other paired nodes, as in 541. Records may comprise data, cache, DNS records, logs, and any information associated to or related to a disengaging node. In one embodiment, a termination condition may comprise a kill-switch key emailed to the second node. A SMTP or email agent may scan the email for the kill-switch key, and if it exists, disengaging instructions are initiated. Disengaging instructions may comprise deleting all associated logs, messages, cache, DNS, etc. on the second node. Disengaging instructions may further comprise transmitting instructions to all other paired nodes of the network or known to the second node, which may have records related to the second node such that these records may also be deleted. Another kill-switch key may comprise an entry of a P2P TCP dump with unique authentication factors, or other packet injection or transmission methods.

3. Secure Dynamic Address Resolution and Communication Between Nodes

Figure 6A:
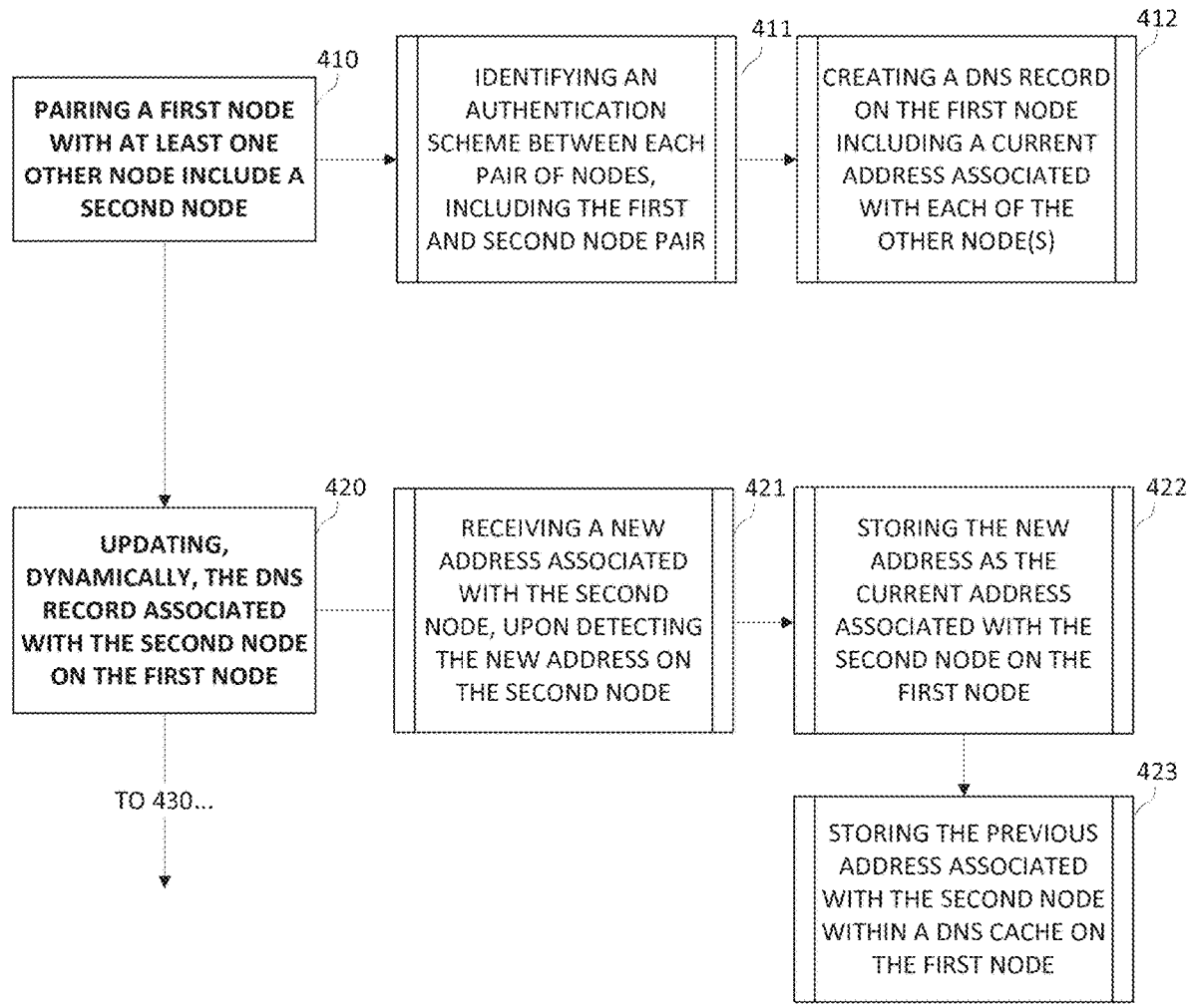
FIG. 6A is a flow chart illustrating a method for providing secure dynamic address resolution and communication between a plurality of nodes of the present invention.
Figure 6B:
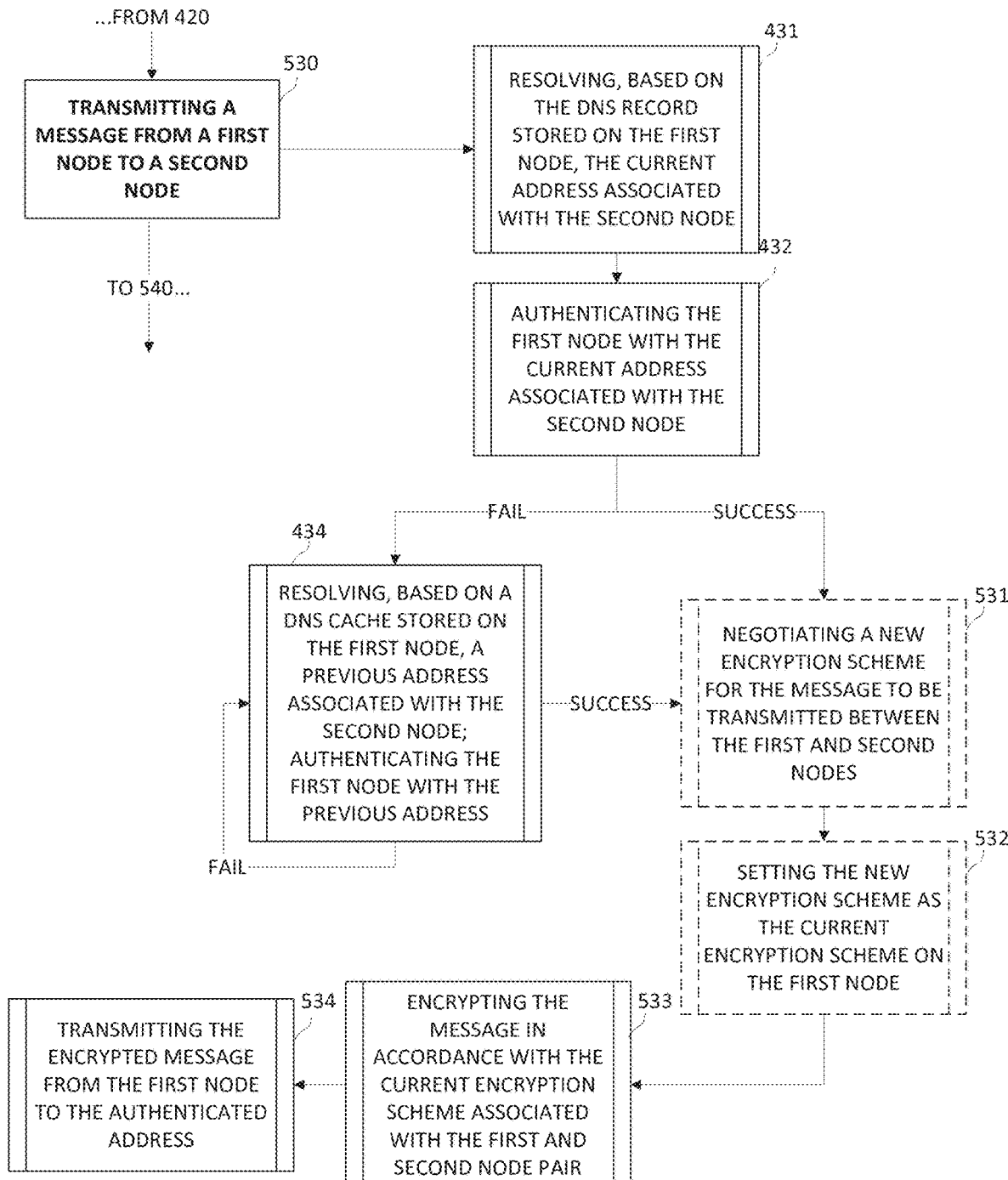
FIG. 6B is a flow chart illustrating a method for providing secure dynamic address resolution and communication between a plurality of nodes of the present invention.
Figure 6C:
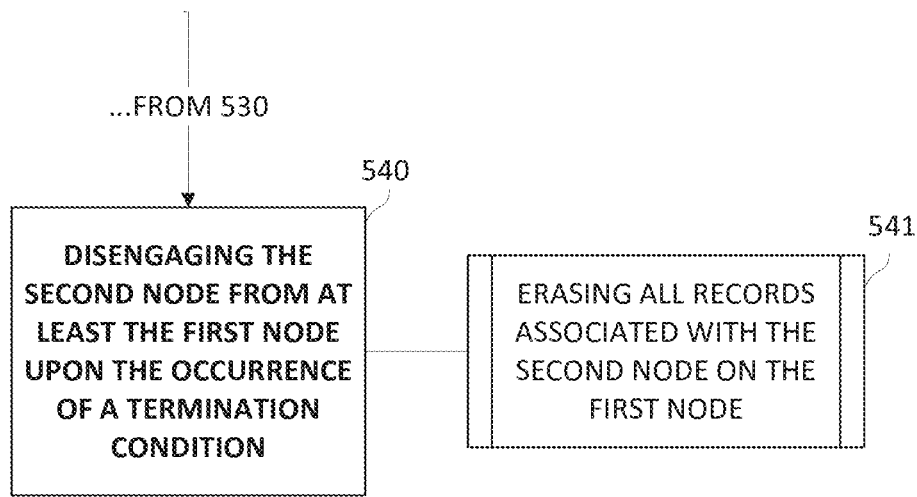
FIG. 6C is a flow chart illustrating a method for providing secure dynamic address resolution and communication between a plurality of nodes of the present invention.

Drawing attention to FIGS. 6A-6B, a method for providing secure dynamic address resolution and communication may combine various process steps and features described above of the various methods embodied by FIGS. 4 and 5. Accordingly, a plurality of nodes is paired, such as at least the first node and other node(s) including the second node as in 410. An authentication scheme is identified between each pair of nodes, including the first and second node pair, as in 411. A DNS record may be created on the first node including a current address associated with each of the other node(s) including the second node, as in 412.

The DNS record associated with a second node may be updated dynamically on the first node, as in 420. Accordingly, a new address associated with the second node may be received at the first node, upon detecting the new address on the second node 421. The new address is stored as the current address associated with the second node on the first node, as in 422. The previous address of the second node may, in one embodiment, be stored within a DNS cache on the first node, as in 423.

A message may be transmitted from the first node to the second node, as in 530. The current address associated with the second node in resolved, as in 431, based on the DNS record stored on the first node. The first node is then authenticated with the current address associated with the second node, as in 432. In one embodiment, if the authentication fails, such that the second node may not be reachable, a previous address associated with the second node may be resolved at the first node, as in 434, and the authentication step is reinitiated with the previous address. This step 434 may recur until a previous address returns a successful authentication, or until the list of previous addresses is exhausted. Upon successful authentication, a new encryption scheme may be negotiated for the message to be transmitted between the first and second node pair, as in 531. The encryption scheme may then be set as the current encryption scheme on the first node, as in 532. As discussed above, The negotiation 531 and setting new encryption 532 steps may be performed at predetermined intervals, such as prior to, after the transmission of each message, after a predetermined number of messages, or upon the occurrence of some condition, such as when a current address is dynamically updated at one or more of the paired nodes.

The second node may be disengaged from the plurality of nodes upon the occurrence of a termination condition, as in 540. All records associated with the second node may be erased on all other paired nodes, as in 541.

Individual components or elements of the system and method may be used interchangeably. The order of the method or processes described above may be arranged in any combination in various embodiments. In some embodiments, various steps may be omitted.

It should also be understood that the above methods may exist as other embodiments when not in operation. Specifically, a computer program may exist on a non-transitory storage medium such as a hard disk, flash drive, nonvolatile memory, or other storage device, which captures the operational processes and characteristics described above, and which may be executed by a computer or other device to perform the method described above. The computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations.

Further, a physical system may also be designed by employing existing components and hardware known to those of ordinary skill in the art, such as to effect the operation of the method described above in a general purpose computer, a specialized computer or machine, as a software on chip, or as part of other integrated circuits or combination of circuitry and components.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method for node-based DNS resolution, the method comprising:
    creating a first DNS record on a first node, said first DNS record comprising a second-node address;
    creating a second DNS record on a second node, said second DNS record comprising a first-node address; and
    dynamically updating, via at least one microprocessor, said first DNS record, comprising:
    receiving and storing a new second-node address on said first node;
    designating said new second-node address as a current second-node address of said second node; and
    designating said second-node address as a previous second-node address of said second node.

2. The method as recited in claim 1, further comprising:
    dynamically updating, via said at least one microprocessor, said second DNS record, comprising:
    receiving a new first-node address from said first node;
    storing said new first-node address on said second node;
    designating said new first-node address as a current first-node address of said first node;
    designating said first-node address as a previous first-node address of said first node; and
    storing said previous first-node address on said second node.

3. The method as recited in claim 1, further comprising storing a plurality of previous second-node addresses.

4. The method as recited in claim 1, further comprising storing a plurality of previous first-node addresses.

5. The method as recited in claim 1, further comprising resolving a second-node alias address based on said current second-node address.

6. The method as recited in claim 1, further comprising resolving a second-node alias address based on said plurality of previous second-node addresses.

7. The method as recited in claim 1, further comprising disengaging said second node from said first node based on a termination condition, said disengaging comprising erasing all records associated with said second node from said first node.

8. The method as recited in claim 1, further comprising authenticating said second node, by said first node, and based on a unique key generated by said second node and agreed by said first node.

9. The method as recited in claim 1, further comprising authenticating said first node, by said second node, and based on a unique key generated by said first node and agreed by said second node.

10. The method as recited in claim 1, further comprising modifying a DNS record on at least one other node based on a successful pairing of said first node and said second node, said modifying comprising including said current second-node address in said DNS record of said at least one other node.

11. A system of node-based DNS resolution, the system comprising:
    at least one microprocessor; and
    at least one memory storing computer-executable instructions, said at least one microprocessor operable to access said at least one memory and execute said computer-executable instructions to:
    create a first DNS record on a first node, said first DNS record comprising a second-node address;
    create a second DNS record on a second node, said second DNS record comprising a first-node address; and
    dynamically update said first DNS record, said updating comprising:
    receiving and storing a new second-node address on said first node;
    designating said new second-node address as a current second-node address of said second node; and
    designating said second-node address as a previous second-node address of said second node.

12. The system as recited in claim 11, further comprising:
    dynamically updating said second DNS record, said updating comprising:
    receiving a new first-node address from said first node;
    storing said new first-node address on said second node;
    designating said new first-node address as a current first-node address of said first node;

designating said first-node address as a previous first-node address of said first node; and storing said previous first-node address on said second node.

13. The system as recited in claim 11, wherein said dynamically updating said first DNS record further comprises storing a plurality of previous second-node addresses.

14. The system as recited in claim 11, wherein said dynamically updating said second DNS record further comprises storing a plurality of previous first-node addresses.

15. The system as recited in claim 11, wherein said computer-executable instructions are further operable to resolve a second-node alias address based on said current second-node address.

16. The system as recited in claim 11, wherein said computer-executable instructions are further operable to resolve a second-node alias address based on said plurality of previous second-node addresses.

17. The system as recited in claim 11, wherein said computer-executable instructions are further operable to disengage said second node from said first node, said disengaging comprising erasure from said first node of all records associated with said second node.

18. The system as recited in claim 11, wherein said computer-executable instructions are further operable to authenticate said second node, by said first node, and based on a unique key generated by said second node and agreed by said first node.

19. The system as recited in claim 11, wherein said computer-executable instructions are further operable to authenticate said first node, by said second node, and based on a unique key generated by said first node and agreed by said second node.

20. The system as recited in claim 11, wherein said computer-executable instructions are further operable to modify a DNS record on at least one other node based on a successful pairing of said first node and said second node, said modifying comprising including said current second-node address in said DNS record of said at least one other node.

* * * * *